United States Patent
Astaix et al.

(10) Patent No.: US 11,433,709 B2
(45) Date of Patent: Sep. 6, 2022

(54) RADIAL TIRE HAVING A VERY THIN BELT STRUCTURE

(71) Applicant: COMPAGNIE GENERALE DES ETABLISSEMENTS MICHELIN, Clermont-Ferrand (FR)

(72) Inventors: Camille Astaix, Clermont-Ferrand (FR); Aurore Lardjane, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 711 days.

(21) Appl. No.: 15/547,986

(22) PCT Filed: Jan. 22, 2016

(86) PCT No.: PCT/EP2016/051305
§ 371 (c)(1),
(2) Date: Aug. 1, 2017

(87) PCT Pub. No.: WO2016/124419
PCT Pub. Date: Aug. 11, 2016

(65) Prior Publication Data
US 2018/0022159 A1    Jan. 25, 2018

(30) Foreign Application Priority Data
Feb. 3, 2015 (FR) ...................... 1550814

(51) Int. Cl.
*B60C 9/20* (2006.01)
*B60C 9/22* (2006.01)
(Continued)

(52) U.S. Cl.
CPC ............ *B60C 9/2003* (2013.01); *B60C 9/005* (2013.01); *B60C 9/0042* (2013.01);
(Continued)

(58) Field of Classification Search
CPC .......... B60C 9/0064; B60C 2009/2252; B60C 2009/2257
See application file for complete search history.

(56) References Cited

U.S. PATENT DOCUMENTS

| 3,638,706 A | 2/1972 | Wilson et al. |
| 4,284,117 A | 8/1981 | Poque et al. |

(Continued)

FOREIGN PATENT DOCUMENTS

| CN | 102361746 A | 2/2012 |
| CN | 104114378 A | 10/2014 |

(Continued)

OTHER PUBLICATIONS

International Search Report dated Mar. 18, 2016, issued by EPO in connection with International Application No. PCT/EP2016/051305.

(Continued)

*Primary Examiner* — Kendra Ly
(74) *Attorney, Agent, or Firm* — Venable LLP

(57) ABSTRACT

A radial tire, notably for a passenger vehicle or van, has a very thin belt structure comprising a multilayer composite laminate of specific construction, with a first layer of rubber reinforced by circumferential textile reinforcers in the form of monofilaments or assemblies of monofilaments, preferably slightly heat-shrinkable, for example made of nylon or of polyester, this first layer radially (in the direction Z) surmounting two other layers of rubber, reinforced by high-strength steel monofilaments. The mean thickness of rubber, measured in the radial direction (Z), separating a first reinforcer from the second reinforcer which is closest to it, and that separating a second reinforcer from the third reinforcer which is closest to it, are both less than or at most equal to 0.35 mm.

22 Claims, 4 Drawing Sheets

(51) Int. Cl.
  *B60C 9/00* (2006.01)
  *D02G 3/48* (2006.01)
(52) U.S. Cl.
  CPC .......... *B60C 9/0064* (2013.01); *B60C 9/2009* (2013.01); *D02G 3/48* (2013.01); *B60C 2009/2016* (2013.01); *B60C 2009/2067* (2013.01); *B60C 2009/2077* (2013.01); *B60C 2009/2083* (2013.01); *B60C 2009/2096* (2013.01); *D10B 2331/02* (2013.01); *D10B 2331/04* (2013.01)

(56) References Cited

U.S. PATENT DOCUMENTS

| | | | |
|---|---|---|---|
| 4,371,025 A | 2/1983 | Canevari et al. | |
| 4,724,881 A | 2/1988 | Poque et al. | |
| 4,819,705 A * | 4/1989 | Caretta | B60C 9/2006 152/527 |
| 5,427,165 A | 6/1995 | Balestra et al. | |
| 5,442,903 A | 8/1995 | Lagarrigue | |
| 5,551,498 A | 9/1996 | Komatsuki | 152/527 |
| 5,858,137 A | 1/1999 | Assaad et al. | |
| 6,609,552 B2 | 8/2003 | Miyazaki et al. | |
| 8,281,837 B2 | 10/2012 | Hashimoto et al. | 152/533 |
| 8,763,662 B2 | 7/2014 | Abad et al. | |
| 8,785,543 B2 | 7/2014 | Abad et al. | |
| 8,790,788 B2 | 7/2014 | Custodero et al. | |
| 8,968,871 B2 | 3/2015 | Abad et al. | |
| 8,973,634 B2 | 3/2015 | Custodero et al. | |
| 9,211,764 B2 | 12/2015 | Ichihara | B60C 9/20 |
| 9,540,766 B2 | 1/2017 | Abad et al. | |
| 9,821,606 B2 | 11/2017 | Abad et al. | |
| 9,840,644 B2 | 12/2017 | Doisneau et al. | |
| 9,902,204 B2 | 2/2018 | Lardjane et al. | |
| 9,919,563 B2 | 3/2018 | Lardjane et al. | |
| 10,005,929 B2 | 6/2018 | Doisneau et al. | |
| 10,040,976 B2 | 8/2018 | Doisneau et al. | |
| 2002/0011296 A1 | 1/2002 | Miyazaki et al. | |
| 2002/0033218 A1* | 3/2002 | Ohura | B60C 9/20 152/538 |
| 2002/0055583 A1 | 5/2002 | Iizuka et al. | |
| 2002/0088523 A1 | 7/2002 | Miyazaki et al. | |
| 2009/0283194 A1 | 11/2009 | Hashimoto et al. | 152/527 |
| 2011/0259501 A1 | 10/2011 | Assaad | 152/527 |
| 2012/0125506 A1 | 5/2012 | Custodero et al. | |
| 2012/0128972 A1 | 5/2012 | Custodero et al. | |
| 2012/0180921 A1 | 7/2012 | Abad et al. | |
| 2012/0193006 A1 | 8/2012 | Ueda | |
| 2012/0241068 A1 | 9/2012 | Ichihara | 152/535 |
| 2012/0267023 A1 | 10/2012 | Abad et al. | |
| 2013/0177764 A1 | 7/2013 | Abad et al. | |
| 2013/0273366 A1 | 10/2013 | Abad et al. | |
| 2013/0280511 A1 | 10/2013 | Abad et al. | |
| 2014/0044964 A1 | 2/2014 | Abad et al. | |
| 2014/0045983 A1 | 2/2014 | Abad et al. | |
| 2014/0045984 A1 | 2/2014 | Abad et al. | |
| 2014/0051312 A1 | 2/2014 | Abad et al. | |
| 2014/0235124 A1 | 8/2014 | Doisneau et al. | |
| 2014/0235125 A1 | 8/2014 | Doisneau et al. | |
| 2014/0308864 A1 | 10/2014 | Doisneau et al. | |
| 2014/0373993 A1 | 12/2014 | Ichihara | 152/527 |
| 2015/0004413 A1 | 1/2015 | Abad et al. | |
| 2015/0007922 A1* | 1/2015 | Lardjane | B60C 9/22 152/527 |
| 2015/0013873 A1 | 1/2015 | Lardjane et al. | 152/527 |
| 2015/0030851 A1 | 1/2015 | Abad et al. | |
| 2015/0314647 A1 | 11/2015 | Kakizawa et al. | B60C 9/0007 |
| 2016/0159154 A1 | 6/2016 | Noel et al. | B60C 9/2006 |
| 2016/0159155 A1 | 6/2016 | Astaix et al. | B60C 9/2009 |
| 2016/0193879 A1 | 7/2016 | Astaix et al. | |
| 2017/0226322 A1 | 8/2017 | Thuilliez | |
| 2018/0022157 A1 | 1/2018 | Lardjane et al. | |
| 2018/0022158 A1 | 1/2018 | Lardjane et al. | |
| 2018/0022160 A1 | 1/2018 | Astaix et al. | |
| 2018/0118983 A1 | 5/2018 | Doisneau et al. | |

FOREIGN PATENT DOCUMENTS

| | | |
|---|---|---|
| DE | 2450962 A1 | 5/1975 |
| DE | 11 2012 005 462 T5 | 9/2014 |
| EP | 0500480 A1 | 8/1992 |
| EP | 0 621 143 A1 | 10/1994 |
| EP | 0517870 B1 | 7/1996 |
| EP | 0738615 A2 | 10/1996 |
| EP | 0795426 A1 | 9/1997 |
| EP | 1162086 A2 | 12/2001 |
| EP | 1184203 A2 | 3/2002 |
| EP | 2 123 480 A2 | 11/2009 |
| EP | 2 380 754 A2 | 10/2011 |
| EP | 2 505 386 A1 | 10/2012 |
| FR | 1495730 | 9/1967 |
| FR | 2022643 | 7/1970 |
| FR | 2504067 | 10/1982 |
| FR | 2577478 A1 | 8/1986 |
| FR | 3 008 998 A1 | 1/2015 |
| JP | 6-305304 A | 11/1994 |
| JP | 10-53981 A | 2/1998 |
| JP | 2002-154304 A | 5/2002 |
| WO | 2010/105975 A1 | 9/2010 |
| WO | 2010/136389 A1 | 12/2010 |
| WO | 2010/143017 A1 | 12/2010 |
| WO | 2011/012521 A1 | 2/2011 |
| WO | 2011/051204 A1 | 5/2011 |
| WO | 2012/016757 A1 | 2/2012 |
| WO | 2012/038340 A1 | 3/2012 |
| WO | 2012/038341 A1 | 3/2012 |
| WO | 2012/069346 A1 | 5/2012 |
| WO | 2012/104279 A1 | 8/2012 |
| WO | 2012/104280 A1 | 8/2012 |
| WO | 2012/104281 A1 | 8/2012 |
| WO | 2013/017421 A1 | 2/2013 |
| WO | 2013/017422 A1 | 2/2013 |
| WO | 2013/017423 A1 | 2/2013 |
| WO | 2013/117474 A1 | 8/2013 |
| WO | 2013/117475 A1 | 8/2013 |
| WO | 2013/117476 A1 | 8/2013 |
| WO | 2013/117477 A1 | 8/2013 |
| WO | 2015/014575 A1 | 2/2015 |

OTHER PUBLICATIONS

B. Yilmaz, "Investigation of Twisted Monofilament Cord Properties Made of Nylon 6.6 and Polyester", Fibers and Polymers 2011, vol. 12, No. 8, 1091-1098.

* cited by examiner

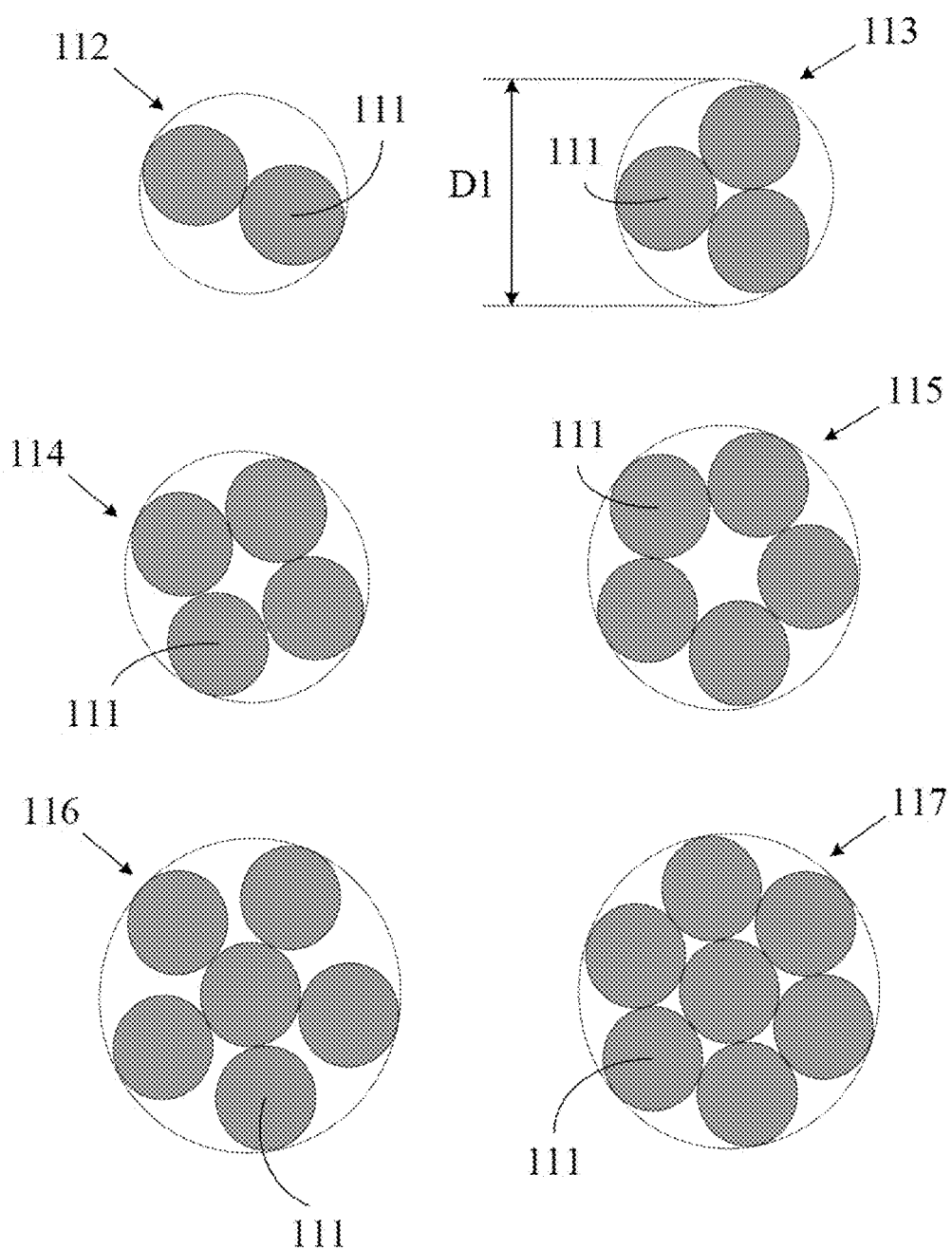

RADIAL TIRE HAVING A VERY THIN BELT STRUCTURE

1. FIELD OF THE INVENTION

The present invention relates to vehicle tyres and to the crown reinforcement or belt thereof. It relates more specifically to the multilayer composite laminates used in the belt of such tyres notably for passenger vehicles or vans.

2. PRIOR ART

A tyre with a radial carcass reinforcement for a passenger vehicle or van comprises, as is known, a tread, two inextensible beads, two flexible sidewalls connecting the beads to the tread and a rigid crown reinforcement or "belt" arranged circumferentially between the carcass reinforcement and the tread.

The tyre belt is generally made up of at least two rubber plies referred to as "working plies", "triangulation plies" or else "working reinforcement" which are superposed and crossed, usually reinforced with metal cords disposed substantially parallel to one another and inclined with respect to the median circumferential plane, it being possible for these working plies to be associated or not to be associated with other plies and/or fabrics of rubber. These working plies have the primary function of giving the tyre high drift thrust or cornering stiffness which, in the known way, is necessary for achieving good road holding ("handling") on the motor vehicle.

The above belt, and this is particularly true of tyres liable to run at sustained high speeds, may further comprise above the working plies (on the tread side) an additional rubber ply, referred to as "hooping ply" or "hoop reinforcement", which is generally reinforced with reinforcing threads referred to as "circumferential", which means to say that these reinforcing threads are disposed practically parallel to one another and extend substantially circumferentially around the tyre casing to form an angle preferably in a range from −5° to +5° with the median circumferential plane. The primary role of these circumferential reinforcing threads is, it should be remembered, to withstand the centrifuging of the crown at high speed.

Such belt structures, which ultimately consist of a multilayer composite laminate comprising at least one hooping ply, usually textile, and two working plies, generally of metal, are well known to a person skilled in the art and do not need to be described in greater detail here.

The general prior art describing such belt structures is illustrated in particular by patent documents U.S. Pat. No. 4,371,025, FR 2 504 067 or U.S. Pat. No. 4,819,705, EP 738 615, EP 795 426 or U.S. Pat. No. 5,858,137, EP 1 162 086 or US 2002/0011296, EP 1 184 203 or US 2002/0055583.

The availability of increasingly strong and durable steels means that tyre manufacturers are nowadays, as far as possible, tending towards the use in tyre belts of cords of a very simple structure, notably having just two threads, or even of individual filaments, in order on the one hand to simplify the manufacture and reduce costs, and on the other hand to reduce the thickness of the reinforcing plies and thus the hysteresis of the tyres, and ultimately to reduce the energy consumption of the vehicles fitted with such tyres.

However, efforts aimed at reducing the mass of the tyres, in particular by reducing the thickness of their belt and of the layers of rubber of which it is made, do, quite naturally, come up against physical limits which may give rise to a certain number of difficulties. In particular, it sometimes happens that the hooping function afforded by the hoop reinforcement and the stiffening function afforded by the working reinforcement are no longer sufficiently differentiated from one another and can interfere with one another. Of course, all of that is detrimental to the correct operation of the crown of the tyre, and to the performance and overall endurance of the tyre.

Thus, patent applications WO 2013/117476 and WO 2013/117477, filed by the applicant companies have proposed a multilayer composite laminate with a specific structure that allows the belt of the tyres to be lightened appreciably, and thus their rolling resistance to be lowered, while alleviating the abovementioned drawbacks.

These applications disclose a radial tyre, defining three main directions, circumferential, axial and radial, comprising a crown surmounted by a tread, two sidewalls, two beads, each sidewall connecting each bead to the crown, a carcass reinforcement that is anchored in each of the beads and extends in the sidewalls and into the crown, a crown reinforcement or belt that extends in the crown in the circumferential direction and is situated radially between the carcass reinforcement and the tread, the said belt comprising a multilayer composite laminate comprising at least three superposed layers of reinforcers, the said reinforcers being unidirectional within each layer and embedded in a thickness of rubber, with, notably:

- on the tread side, a first layer of rubber comprising a first row of reinforcers which are oriented at an angle alpha of −5 to +5 degrees with respect to the circumferential direction, these reinforcers, referred to as first reinforcers, being made of a heat-shrinkable textile material;
- in contact with the first layer and disposed beneath the latter, a second layer of rubber comprising a second row of reinforcers which are oriented at a given angle beta, which is positive or negative, of between 10 and 30 degrees with respect to the circumferential direction, these reinforcers, referred to as second reinforcers, being metal reinforcers;
- in contact with the second layer and disposed beneath the latter, a third layer of rubber comprising a third row of reinforcers which are oriented at an angle gamma the opposite of the angle beta, itself being between 10 and 30 degrees with respect to the circumferential direction, these reinforcers, referred to as third reinforcers, being metal reinforcers.

The first reinforcers preferably made of polyamide or of polyester, are made up of multifilament fibres, comprising a very large number (typically several hundreds) of elementary filaments of very small diameter which are twisted together in the form of conventional textile cords. The second and third reinforcers themselves consist of individual steel monofilaments, particularly made of very high strength carbon steel.

The above patent applications have demonstrated that it is possible, through the specific construction of their multilayer composite laminate, notably through the use of textile circumferential reinforcers the heat-shrinkability of which is controlled and of metal reinforcers in the form of individual monofilaments of small diameter, to achieve an appreciable reduction in the overall thickness of the belts of tyres, and to do so without detracting from the correct operation and differentiation of the functions, on the one hand, of hooping afforded by the circumferential reinforcers of the first layer and, on the other hand, of stiffening, afforded by the metal reinforcers of the two other layers.

Thus, the weight of the tyres and the rolling resistance thereof can be reduced, at low cost thanks to the use of steel monofilaments that do not require any prior assembly operation, and this can be achieved without penalty to the cornering stiffness or the overall endurance in driving.

The object of the tyre manufacturers starting from the multilayer laminates described in the above two applications to further reduce the thicknesses of the (first, second and third) layers of rubber now comes up against the risk of creating, in the radial direction (Z), here or there in the apex of the tyre direct contacts between the reinforcers of these different layers, which would be prejudicial to the correct operation and the endurance of the laminate.

In particular, a direct contact between the circumferential textile reinforcers, that are known to naturally contain and be likely to convey a certain quantity of water variable dependent on the nature of the heat-shrinkable textile material, and the steel monofilaments, could ultimately lead to a surface corrosion thereof, therefore a loss of resistance, without mentioning a risk of degradation of the adhesion with the surrounding rubber, ultimately a risk of reducing the overall endurance of the working reinforcement after prolonged running of the tyres.

3. BRIEF DESCRIPTION OF THE INVENTION

In continuing their research, the applicant companies have developed an improved multilayer composite laminate, of novel architecture, which addresses the above problem and which can therefore constitute an advantageous alternative to the laminates described in the abovementioned two applications, when there is a desire to further reduce the thicknesses of the layers of rubber and consequently the rolling resistance of the tyres.

Thus, a first subject of the present invention relates (according to the references given in the appended FIGS. 1 and 2) to a radial tyre (1), defining three main directions, circumferential (X), axial (Y) and radial (Z), comprising a crown (2) surmounted by a tread (3), two sidewalls (4), two beads (5), each sidewall (4) connecting each bead (5) to the crown (2), a carcass reinforcement (7) that is anchored in each of the beads (5) and extends in the sidewalls (4) as far as the crown (2), a crown reinforcement or belt (10) that extends in the crown (2) in the circumferential direction (X) and is situated radially between the carcass reinforcement (7) and the tread (3), the said belt (10) comprising a multilayer composite laminate (10a, 10b, 10c) comprising at least three superposed layers of reinforcers (110, 120, 130), the said reinforcers being unidirectional within each layer and embedded in a thickness of rubber (C1, C2, C3 respectively), with:

on the tread side, a first layer (10a) of rubber (C1) comprising a first row of reinforcers (110) which are oriented at an angle alpha of −5 to +5 degrees with respect to the circumferential direction (X), these reinforcers (110), referred to as first reinforcers, being made of a heat-shrinkable textile material;

in contact with the first layer (10b) and disposed beneath the latter, a second layer (10b) of rubber (C2) comprising a second row of reinforcers (120) which are oriented at a given angle beta, which is positive or negative, of between 10 and 30 degrees with respect to the circumferential direction (X), these reinforcers (120), referred to as second reinforcers, being metal reinforcers;

in contact with the second layer (10b) and disposed beneath the latter, a third layer (10c) of rubber (C3) comprising a third row of reinforcers (130) which are oriented at an angle gamma the opposite of the angle beta, itself being between 10 and 30 degrees with respect to the circumferential direction (X), these reinforcers (130), referred to as third reinforcers, being metal reinforcers, This tyre being characterized in that:

the first reinforcers (110) made of heat-shrinkable textile material are monofilaments with a diameter or thickness $\varphi$ greater than 0.10 mm, or assemblies of such monofilaments;

the angle of diameter denoted D1 of the first reinforcers (110) is between 0.20 mm and 1.20 mm;

the second (120) and third (130) reinforcers are steel monofilaments with a diameter or thickness, respectively D2 and D3, of between 0.20 mm and 0.50 mm;

the following features, measured in the central part of the belt of the tyre in the vulcanized state, on either side of the median plane (M) over a total axial width of 10 cm, are verified:

the mean thickness $Ez_1$ of rubber separating a first reinforcer (110) from the second reinforcer (120) which is closest to it, measured in the radial direction (Z), is less than or equal to 0.35 mm;

the mean thickness $Ez_2$ of rubber separating a second reinforcer (120) from the third reinforcer (130) which is closest to it, measured in the radial direction (Z), is less than or equal to 0.35 mm.

The risks of corrosion or of loss of adhesion described above are reduced significantly, in the laminate, through the use of textile reinforcers (110) in the form of monofilaments of large diameter or of assemblies of such monofilaments, instead of the conventional textile cords based on multifilament fibres as described in the abovementioned applications WO 2013/117476 and WO 2013/117477.

The multilayer composite laminate according to the invention can be used as a belt reinforcing element for any type of tyre, particularly for passenger vehicles notably including 4×4s and SUVs (Sport Utility Vehicles) or for vans.

BRIEF DESCRIPTION OF THE DRAWINGS

The invention and its advantages will be readily understood in the light of the following detailed description and exemplary embodiments, and also FIGS. 1 to 4 relating to these embodiments, which schematically show (unless otherwise indicated, not to a specific scale):

in radial section (which means a section in a plane containing the axis of rotation of the tyre), an example of a tyre (1) according to the invention, incorporating within its belt (10) a multilayer composite laminate according to the invention (FIG. 1);

Figure 2:
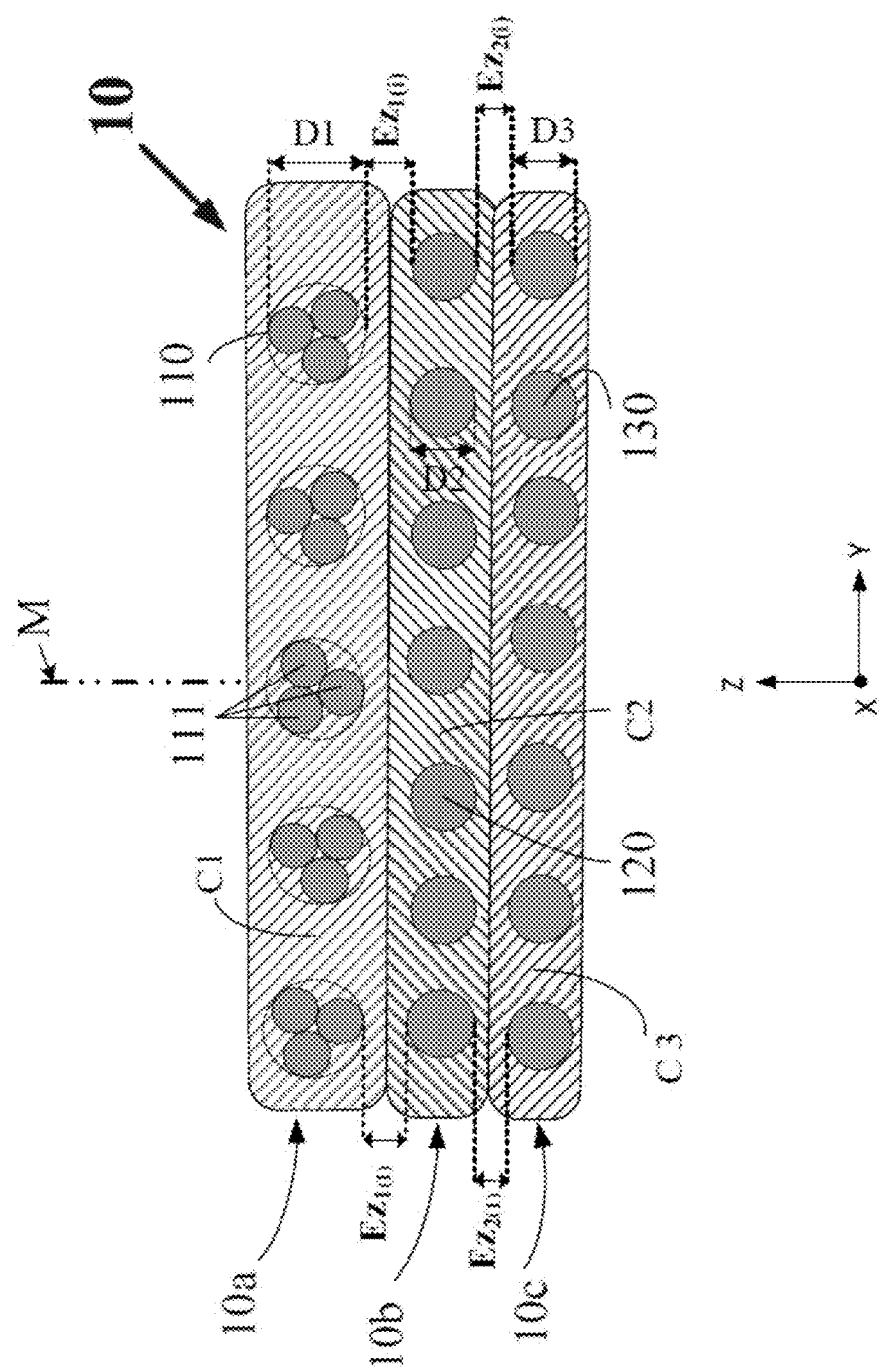
Figure 3:
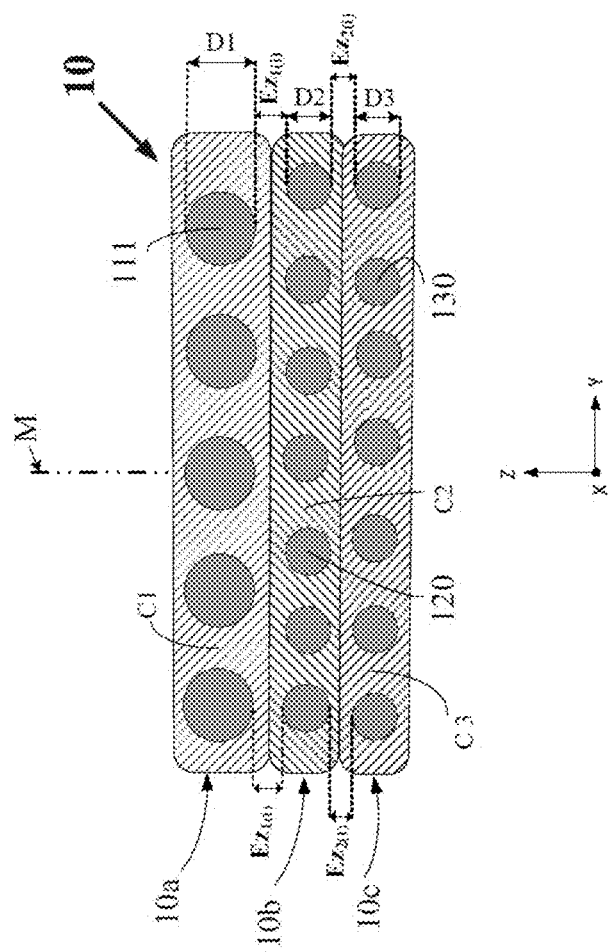

in cross section, two examples of a composite multilayer laminate (10a, 10b, 10c) that is used in the tyre (1) according to the invention, using the heat-shrinkable textile reinforcers (110) respectively in the form of a collection of monofilaments (FIG. 2) or of an individual monofilament (FIG. 3);

in cross section, various possible examples of assemblies of monofilaments (111) made of heat-shrinkable textile material that are usable as reinforcers (110) in the first layer (10a) of the multilayer composite laminate according to the invention (FIG. 4).

4. DEFINITIONS

In the present application, the following definitions are adopted:

"rubber" or "elastomer" (the two terms being considered to be synonymous): any type of elastomer, be it of the diene type or the non-diene type, for example thermoplastic;

"rubber composition" or "rubbery composition": a composition which contains at least one rubber and one filler;

"layer": a sheet, strip or any other element the thickness of which is relatively small compared to its other dimensions, preferably of which the ratio of the thickness to the largest of the other dimensions is less than 0.5, more preferably less than 0.1;

"axial direction": a direction substantially parallel to the axis of rotation of the tyre;

"circumferential direction": a direction which is substantially perpendicular both to the axial direction and to a radius of the tyre (in other words, tangential to a circle the centre of which lies on the axis of rotation of the tyre);

"radial direction": a direction along a radius of the tyre, that is to say any direction that passes through the axis of rotation of the tyre and is substantially perpendicular to this direction, that is to say making an angle of no more than 5 degrees with a perpendicular to this direction;

a "monofilament" generally means any individual filament, whatever the shape of its cross section, the diameter (in the case of a circular cross section) or thickness (in the case of a non-circular cross section) of which is greater than 100 µm. This definition equally covers monofilaments of essentially cylindrical shape (with circular cross section) and monofilaments of other shapes, for example oblong monofilaments (of flattened shape) or of rectangular or square cross section;

"oriented along an axis or in a direction", when speaking of any element such as a reinforcer, means an element which is oriented substantially parallel to this axis or this direction, that is to say that makes an angle of not more than 5 degrees (which is therefore zero or at most equal to 5 degrees) with this axis or this direction;

"oriented perpendicularly to an axis or a direction": when speaking of any element such as a reinforcer, an element which is oriented substantially perpendicularly to this axis or this direction, that is to say making an angle of no more than 5 degrees with a perpendicular to this axis or this direction;

"median circumferential plane" (denoted M): the plane perpendicular to the axis Y of rotation of the tyre which is situated mid-way between the two beads and passes through the middle of the crown reinforcement or belt;

"reinforcer" or "reinforcing thread": any long and slender strand, that is to say any longilinear, filiform strand with a length that is long in relation to its cross section, notably any individual filament, any multifilament fibre or any assembly of such filaments or fibres such as a folded yarn or a cord, it being possible for this strand or thread to be rectilinear or non-rectilinear, for example twisted, or crimped, such a strand or thread being able to reinforce a rubber matrix (that is to say to improve the tensile properties of the matrix);

"unidirectional reinforcers": reinforcers that are essentially mutually parallel, that is to say oriented along one and the same axis;

"laminate" or "multilayer laminate": within the meaning of the International Patent Classification, any product comprising at least two layers, of flat or non-flat form, which are in contact with one another, it being possible for the latter to be or not to be joined, and connected together; the expression "joined" or "connected" should be interpreted broadly so as to include all means of joining or assembling, in particular via adhesive bonding.

Moreover, unless expressly indicated otherwise, all the percentages (%) shown are % by weight.

The expression "x and/or y" means "x" or "y" or both (namely "x and y"). Any range of values denoted by the expression "between a and b" represents the field of values ranging from more than "a" to less than "b" (that is to say endpoints "a" and "b" excluded) whereas any range of values denoted by the expression "from "a" to "b" means the field of values ranging from "a" up to "b" (that is to say including the strict limits "a" and "b").

5. DETAILED DESCRIPTION AND EXEMPLARY EMBODIMENTS OF THE INVENTION

Figure 1:
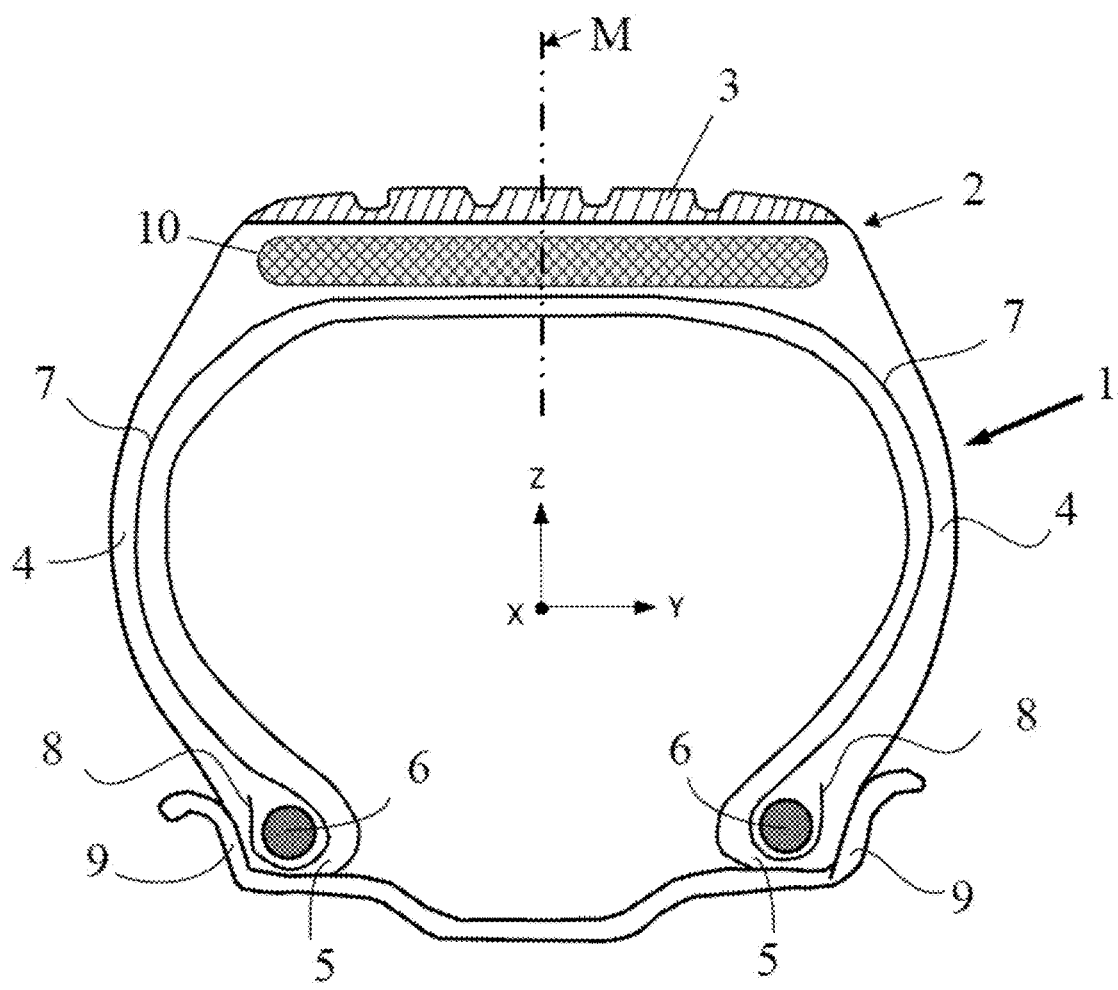

By way of example, FIG. 1 very schematically shows (that is to say without being drawn to any particular scale) a radial section through a tyre according to the invention, for example for a vehicle of the passenger vehicle or van type, the belt of which comprises a multilayer composite laminate according to the invention.

This tyre (1) according to the invention, defining three perpendicular directions, circumferential (X), axial (Y) and radial (Z), comprises a crown (2) surmounted by a tread (3), two sidewalls (4), two beads (5), each sidewall (4) connecting each bead (5) to the crown (2), a carcass reinforcement (7) that is anchored in each of the beads (5) and extends in the sidewalls (4) as far as the crown (2), a crown reinforcement or belt (10) that extends in the crown (2) in the circumferential direction (X) and is situated radially between the carcass reinforcement (7) and the tread (3). The carcass reinforcement (7) is, in the known way, made up of at least one rubber ply reinforced with textile cords referred to as "radial", which are disposed practically parallel to one another and extend from one bead to the other so as to make an angle of generally between 80° and 90° with the median circumferential plane M; in this case, by way of example, it is wrapped around two bead wires (6) in each bead (5), the turn-up (8) of this reinforcement (7) being, for example, disposed towards the outside of the tyre (1) which is shown in this case as mounted on its rim (9).

According to the present invention, and in accordance with the depictions in FIGS. 2 and 3 which will be described in detail later on, the belt (10) of the tyre (1) comprises a multilayer composite laminate comprising three superposed layers (10a, 10b, 10c) of reinforcers, the said reinforcers being unidirectional within each layer and embedded in a thickness of rubber (C1, C2, C3, respectively), with:

on the tread side, a first layer (10a) of rubber (C1) comprising a first row of reinforcers (110) which are oriented at an angle alpha of −5 to +5 degrees with respect to the circumferential direction (X), these reinforcers (110), referred to as first reinforcers, being made of a heat-shrinkable textile material;

in contact with the first layer (10b) and disposed beneath the latter, a second layer (10b) of rubber (C2) comprising a second row of reinforcers (120) which are oriented at a given angle beta, positive or negative, of between 10 and 30 degrees with respect to the circumferential direction (X), these reinforcers (120), referred to as second reinforcers, being metal reinforcers;

in contact with the second layer (10b) and disposed beneath the latter, a third layer (10c) of rubber (C3) comprising a third row of reinforcers (130) which are oriented at an angle gamma the opposite of the angle beta, itself being between 10 and 30 degrees with respect to the circumferential direction (X), identical to or different from the angle beta, these reinforcers (130), referred to as third reinforcers, being metal reinforcers.

According to the invention, the angles β and γ, of opposite direction, which are both between 10° and 30°, may be identical or different, that is to say that the second (120) and third (130) reinforcers may be disposed symmetrically or non-symmetrically on each side of the median circumferential plane (M) defined above.

In this tyre shown schematically in FIG. 1, it will of course be understood that the tread (3), the multilayer laminate (10) and the carcass reinforcement (7) may or may not be in contact with one another, even though these parts have been deliberately separated in FIG. 1, schematically, for the sake of simplicity and to make the drawing clearer. They could be physically separated, at the very least for a portion of them, for example by tie gums, well known to a person skilled in the art, that are intended to optimize the cohesion of the assembly after curing or crosslinking.

According to a first essential feature of the invention, the first reinforcers (110) made of heat-shrinkable textile material are monofilaments or assemblies of monofilaments, such monofilaments, taken individually, having a diameter (or, by definition, a thickness if the monofilament does not have a substantially circular cross section) denoted φ which is greater than 0.10 mm, preferably between 0.15 and 0.80 mm, in particular between 0.20 and 0.60 mm.

The (mean) envelope diameter, D1, of these first textile reinforcers (110) is itself between 0.20 mm and 1.20 mm, preferably between 0.30 mm and 1.00 mm, particularly between 0.40 mm and 0.80 mm; in other words, in the particular case where the reinforcer (110) consists of a unitary textile monofilament of circular cross section, the latter has a diameter φ which is necessarily greater than 0.20 mm. What is meant in the usual way by envelope diameter is the diameter of the imaginary cylinder of revolution surrounding such first textile reinforcers (110) in the general event that the latter are not of circular cross section.

Any heat-shrinkable textile material is suitable, and in particular and preferably a textile material that satisfies the contraction features CT mentioned above is suitable.

Preferably, this heat-shrinkable textile material is selected from the group consisting of polyamides, polyesters and polyketones. Mention may especially be made, among the polyamides, of the polyamides 4-6, 6, 6-6, 11 or 12. Mention may be made, among polyesters, for example of PET (polyethylene terephthalate), PEN (polyethylene naphthalate), PBT (polybutylene terephthalate), PBN (polybutylene naphthalate), PPT (polypropylene terephthalate), and PPN (polypropylene naphthalate). Hybrid reinforcers made up of two (at least two) different materials such as aramid/nylon, aramid/polyester, aramid/polyketone monofilament assemblies, for example, can also be used, in particular and preferably provided that they satisfy the CT characteristic recommended above.

More preferably, the heat-shrinkable textile material of which the first reinforcers (110) are made is a polyamide (nylon) or a polyester.

The density $d_1$ of the first reinforcers (110) in the first layer of rubber (C1), measured in the axial direction (Y), is preferably between 70 and 130 wire/dm, more preferentially between 80 and 120 wire/dm, in particular between 90 and 110 wire/dm.

Their thermal contraction (denoted CT), after 2 min at 185° C., is preferably less than 7.5%, more preferably less than 7.0%, particularly less than 6.0%, which values have proven to be preferable for the manufacturing and dimensional stability of the tyre casings, particularly during the phases of curing and cooling thereof.

This relates to the relative contraction of these first reinforcers (110) under the test conditions mentioned below. The parameter CT is measured, unless specified otherwise, in accordance with the standard ASTM D1204-08, for example on an apparatus of the "Testrite" type under what is known as a standard pretension of 0.5 cN/tex (which is therefore expressed with respect to the titer or linear density of the test specimen being tested). At constant length, the maximum force of contraction (denoted $F_C$) is also measured using the above test, this time at a temperature of 180° C. and under 3% elongation. This force of contraction $F_C$ is preferably greater than 20 N (Newtons). A high force of contraction has proven to be particularly beneficial to the hooping capability of the first reinforcers (110) made of heat-shrinkable textile material with respect to the crown reinforcement of the tyre when the latter heats up under high running speeds.

The above parameters CT and $F_C$ can be measured without distinction on the adhesive-coated initial textile reinforcers before they are incorporated into the laminate and then into the tyre, or alternatively can be measured on these reinforcers once they have been extracted from the central zone of the vulcanized tyre and preferably "derubberized" (that is to say rid of the rubber which coats them in the layer C1).

FIG. 4 schematically shows, in cross section, various examples (112, 113, 114, 115, 116, 117) of assemblies of (respectively 2, 3, 4, 5, 6 and 7) monofilaments (111) made of heat-shrinkable textile material such as polyamide, polyester or polyketone, for example, that can be used as reinforcers (110) in the first layer (10a) of the multilayer composite laminate according to the invention.

Such assemblies and the methods for manufacturing them are well known to a person skilled in the art; they have been described in numerous patent documents, for example in FR 1 495 730, FR 2 022 643 or U.S. Pat. No. 3,638,706, FR 2 577 478 or U.S. Pat. No. 4,724,881, EP 500 480 or U.S. Pat. No. 5,442,903, EP 517 870 or U.S. Pat. No. 5,427,165, WO 2010/143017 or in publications such as "Investigation of twisted monofilament cord properties made of nylon 6.6 and polyester", B. Yilmaz, *Fibers and Polymers* 2011, vol. 12, N° 8, 1091-1098.

Heat-shrinkable textile monofilaments or assemblies of monofilaments offer the advantage, as compared with textile cords formed of conventional multifilament fibres, of better protecting the rest of the multilayer composite laminate against moisture, and of limiting the risks of compromising the adhesion between the various reinforcers of the laminate and their surrounding rubber matrix, not to mention the risks of corrosion of the surface of monofilaments made of steel.

If textile monofilament assemblies are used, they preferably comprise 2 to 10, more preferably 3 to 7, monofilaments made of heat-shrinkable textile material such as polyamide, polyester or polyketone. For the manufacture of these assemblies, the monofilaments are cabled or twisted together using well known techniques, with a twist preferably of between 30 and 200 t/m (twists per metre), more preferably of between 30 and 100 t/m, these monofilaments being in the known way free or practically free of twist on themselves.

The second (120) and third (130) reinforcers consist of steel monofilaments, which, as a reminder, are not twisted, cabled together but used individually; their diameter (or, by definition, thickness if the monofilament does not have a circular cross section), denoted D2 and D3 respectively, is between 0.20 mm and 0.50 mm. D2 and D3 may be identical or different from one layer to the other; if they are different, D3 may be greater than D2 or indeed less than D2, depending on the particular embodiments of the invention.

More preferably, for optimal endurance of the tyre of the invention, notably under harsh running conditions, it is preferable for D2 and D3 to be greater than 0.25 mm and less than 0.40 mm, more preferably in a range from 0.28 to 0.35 mm.

The density, respectively denoted $d_2$ and $d_3$ of the second (120) and third (130) reinforcers in, respectively, the second (C2) and third (C3) layers of rubber, measured in the axial direction (Y), is preferably between 100 and 180 wire/dm, more preferentially between 110 and 170 wire/dm, in particular 120 and 160 wire/dm.

Preferably, the steel of the monofilaments is a carbon steel such as the steels used in cords of the "steel cords" type for tyres; however it is of course possible to use other steels, for example stainless steels, or other alloys.

According to one preferred embodiment, when a carbon steel is used, its carbon content (% by weight of steel) is in a range from 0.5% to 1.2%, more preferably from 0.7% to 1.0%. The invention applies in particular to steels of the normal tensile (NT) or high tensile (HT) steel cord type, the (second and third) reinforcers made of carbon steel then having a tensile strength (Rm) which is preferably higher than 2000 MPa, more preferably higher than 2500 MPa. The invention also applies to super high tensile (SHT), ultra high tensile (UHT) or megatensile (MT) steels of the steel cord type, the (second and third) reinforcers made of carbon steel then having a tensile strength (Rm) which is preferably higher than 3000 MPa, more preferably higher than 3500 MPa. The total elongation at break (At) of these reinforcers, which is the sum of the elastic elongation and the plastic elongation, is preferably greater than 2.0%.

As far as the (second and third) reinforcers made of steel are concerned, the measurements of force at break, strength at break denoted Rm (in MPa) and elongation at break denoted At (total elongation in %) are taken under tension in accordance with ISO standard 6892 of 1984.

The steel used, whether it is in particular a carbon steel or a stainless steel, may itself be coated with a layer of metal which improves for example the workability properties of the steel monofilament or the wear properties of the reinforcer and/or of the tyre themselves, such as the properties of adhesion, corrosion resistance or even resistance to ageing. According to one preferred embodiment, the steel used is covered with a layer of brass (Zn—Cu alloy) or of zinc; it will be recalled that, during the process of manufacturing the wires, the brass or zinc coating makes the wire easier to draw, and makes the wire adhere to the rubber more readily. However, the reinforcers could be covered with a thin layer of metal other than brass or zinc, for example having the function of improving the corrosion resistance of these wires and/or their adhesion to the rubber, for example a thin layer of Co, Ni, Al, of an alloy of two or more of the compounds Cu, Zn, Al, Ni, Co, Sn.

Each layer (C1, C2, C3) of rubber composition (or "layer of rubber" below) of which the multilayer composite laminate is made is based on at least one elastomer and one filler.

For preference, the rubber is a diene rubber, that is to say, as will be recalled, any elastomer (single elastomer or blend of elastomers) which is derived, at least in part (i.e. a homopolymer or copolymer) from diene monomers, that is to say monomers which bear two carbon-carbon double bonds, whether these are conjugated or not.

This diene elastomer is more preferably selected from the group consisting of polybutadienes (BRs), natural rubber (NR), synthetic polyisoprenes (IRs), butadiene copolymers, isoprene copolymers and blends of these elastomers, such copolymers being notably selected from the group consisting of butadiene-styrene copolymers (SBRs), isoprene-butadiene copolymers (BIRs), isoprene-styrene copolymers (SIRs) and isoprene-butadiene-styrene copolymers (SBIRs).

One particularly preferred embodiment consists in using an "isoprene" elastomer, that is to say an isoprene homopolymer or copolymer, in other words a diene elastomer selected from the group consisting of natural rubber (NR), synthetic polyisoprenes (IRs), the various isoprene copolymers and mixtures of these elastomers.

The isoprene elastomer is preferably natural rubber or a synthetic polyisoprene of the cis-1,4 type. Among these synthetic polyisoprenes, use is preferably made of polyisoprenes having a content (mol %) of cis-1,4 bonds of greater than 90%, even more preferably greater than 98%. According to one preferred embodiment, each layer of rubber composition contains 50 to 100 phr of natural rubber. According to other preferred embodiments, the diene elastomer may consist, in full or in part, of another diene elastomer such as, for example, an SBR elastomer used as a blend with another elastomer, for example of the BR type, or used alone.

Each rubber composition may comprise just one or several diene elastomer(s) as well as all or some of the additives customarily used in the rubber matrices intended for the manufacture of tyres, such as for example reinforcing fillers such as carbon black or silica, coupling agents, anti-ageing agents, antioxidants, plasticizing agents or extender oils, whether the latter are of aromatic or non-aromatic nature (notably very weakly aromatic or non-aromatic oils, for example of the naphthene or paraffin type, with high or preferably low viscosity, MES or TDAE oils), plasticizing resins with a high glass transition temperature (above 30° C.), agents that aid with processing (processability of) the compositions in the raw state, tackifying resins, antireversion agents, methylene acceptors and donors such as, for example, HMT (hexamethylenetetramine) or H3M (hexamethoxymethylmelamine), reinforcing resins (such as resorcinol or bismaleimide), known adhesion promoting systems of the metal salts type for example, notably salts of cobalt, of nickel or of lanthanide, a cross-linking or vulcanization system.

Preferably, the system for crosslinking the rubber composition is a system referred to as a vulcanization system, that is to say one based on sulphur (or on a sulphur donor agent) and a primary vulcanization accelerator. Various known secondary vulcanization accelerators or vulcanization activators may be added to this basic vulcanization system. Sulphur is used at a preferred content of between 0.5 and 10 phr, and the primary vulcanization accelerator, for example a sulphenamide, is used at a preferred content of between 0.5 and 10 phr. The content of reinforcing filler, for example of carbon black and/or silica, is preferably higher than 30 phr, notably between 30 and 100 phr.

All carbon blacks, in particular blacks of the HAF, ISAF or SAF type, conventionally used in tyres ("tyre-grade" blacks) are suitable as carbon blacks. Mention will more particularly be made, among the latter, of the carbon blacks of 300, 600 or 700 (ASTM) grade (for example, N326, N330, N347, N375, N683 or N772). Precipitated or fumed silicas having a BET surface area of less than 450 $m^2/g$, preferably from 30 to 400 $m^2/g$, are notably suitable as silicas.

A person skilled in the art will know, in light of the present description, how to adjust the formulation of the rubber compositions in order to achieve the desired levels of properties (especially modulus of elasticity), and how to adapt the formulation to suit the specific application envisaged.

Preferably, each rubber composition has, in the cross-linked state, a secant modulus in extension, at 10% elongation, of between 4 and 25 MPa, more preferably between 4 and 20 MPa; values notably between 5 and 15 MPa have proven to be particularly suitable. Modulus measurements are carried out in tensile tests, unless otherwise indicated in accordance with the standard ASTM D 412 of 1998 (test specimen "C"): the "true" secant modulus (that is to say the one with respect to the actual cross section of the test specimen) is measured in second elongation (that is to say after an accommodation cycle) at 10% elongation, denoted here by Ms and expressed in MPa (under standard temperature and relative humidity conditions in accordance with the standard ASTM D 1349 of 1999).

In order to cause the first, second and third reinforcers to adhere to their three respective layers of rubber (C1, C2, C3) described above, use may be made of any suitable adhesive system, for example a textile glue of the "RFL" (resorcinol-formaldehyde-latex) or equivalent type regarding the first textile reinforcers or for example an adhesive coating such as brass or zinc however regarding the second and third steel reinforcers; it is also possible to use a light steel, that is to say uncoated.

Also, the following essential features, measured in the central part of the belt of the tyre in the vulcanized state, on either side of the median plane (M) over a total axial width of 10 cm, are verified:

the mean thickness $Ez_1$ of rubber separating a first reinforcer (110) from the second reinforcer (120) which is closest to it, measured in the radial direction (Z), is less than or equal to 0.35 mm;

the mean thickness $Ez_2$ of rubber separating a second reinforcer (120) from the third reinforcer (130) which is closest to it measured, in the radial direction (Z), is less than or equal to 0.35 mm.

According to a preferential embodiment of the invention, at least one of the following features (more preferentially all) is verified:

$Ez_1$ is between 0.10 and 0.30, more preferentially between 0.15 and 0.30 mm;

$Ez_2$ is between 0.15 and 0.35, more preferentially between 0.25 and 0.35 mm;

. . . the total thickness of the multilayer composite laminate, namely of its three superposed layers (C1, C2, C3), measured in the radial direction Z, is comprised between 1.8 and 2.7 mm.

All the data (D1, D2, D3, $d_1$, $d_2$, $d_3$, $Ez_1$, $Ez_2$ and total thickness) indicated above are mean values measured experimentally by an operator on photographs of radial sections of vulcanized tyres taken through the central part of the belt, 5 cm on each side of the median plane (M), namely over a total width of 10 cm (namely between −5 cm and +5 cm with respect to the median plane M).

FIGS. 2 and 3 schematically (and without being drawn to any particular scale) depict, in cross section, two examples of the multilayer composite laminate (10a, 10b, 10c) used as a belt (10) in the tyre (1) according to the invention of FIG. 1, the laminate (10) using reinforcers (110) made of heat-shrinkable textile material respectively in the form of an assembly of three monofilaments (FIG. 2) or of a simple individual monofilament (FIG. 3).

As illustrated in FIGS. 2 and 3, $Ez_1$ is the mean of the thicknesses ($Ez_{1(1)}$, $Ez_{1(2)}$, $Ez_{1(3)}$, . . . , $Ez_{1(i)}$) of rubber separating a first reinforcer (110) from the second reinforcer (120) closest to it, these thicknesses each being measured in the radial direction Z and averaged over a total axial distance of between −5.0 cm and +5.0 cm with respect to the centre of the belt (namely, for example, in total around 100 measurements if there are ten reinforcers (110) per cm in the layer C1).

Expressed differently, $Ez_1$ is the mean of the minimum distances $Ez_{1(i)}$ separating each first reinforcer (110) "back-to-back" from the second reinforcer (120) closest to it in the radial direction Z, this mean being calculated over all the first reinforcers (110) present in the central part of the belt, in an axial interval extending between −5 cm and +5 cm with respect to the median plane M.

Similarly, $Ez_2$ is the mean of the thicknesses of rubber ($Ez_{2(1)}$, $Ez_{2(2)}$, $Ez_{2(3)}$, . . . , $Ez_{2(i)}$) separating a second reinforcer (120) from the third reinforcer (130) closest to it, measured in the radial direction Z, this mean being calculated over a total axial distance of between −5.0 cm and +5.0 cm with respect to the centre of the belt. Expressed another way, these thicknesses represent the minimum distances which separate the second reinforcer (120) "back-to-back" from the third reinforcer (130) closest to it in the radial direction Z.

Expressed another way, $Ez_2$ is the mean of the minimum distances $Ez_{2(i)}$ separating each second reinforcer (120) "back-to-back" from the third reinforcer (130) closest to it in the radial direction Z, this mean being calculated over all the second reinforcers (120) present in the central part of the belt, in an axial interval extending between −5 cm and +5 cm with respect to the median plane M.

For an optimized performance in terms of rolling resistance, drift thrust and running endurance, the tyre of the invention preferably satisfies at least one of the following inequalities (more preferably all three):

$$0.15 < Ez_1/(Ez_1+D1+D2) < 0.35$$

$$0.25 < Ez_2/(Ez_2+D2+D3) < 0.45$$

$$0.20 < (Ez_1+Ez_2)/(Ez_1+Ez_2+D1+D2+D3) < 0.40.$$

Even more preferentially, the tyre of the invention preferentially satisfies at least one of the following inequalities (more preferentially all three):

$$0.20 < E_{Z1}/(E_{Z1}+D1+D2) < 0.30$$

$$0.30 < E_{Z2}/(E_{Z2}+D2+D3) < 0.40$$

$$0.25 < (E_{z1}+E_{z2})/(E_{Z1}+E_{Z2}D1+D2+D3) < 0.35$$

In conclusion, the invention offers the possibility of reducing still further the thickness of the belts of tyres and that of the layers of rubber that make up part of the structure thereof, and ultimately the weight and rolling resistance of the tyres, thanks to the use in its first layer of heat-shrinkable textile monofilaments or assemblies of monofilaments.

The invention claimed is:

1. A radial tire, defined in three main directions, circumferential, axial and radial, comprising a crown surmounted by a tread, two sidewalls, two beads, each sidewall connecting each bead to the crown, a carcass reinforcement that is anchored in each of the beads and extends in the sidewalls as far as the crown, a belt that extends in the crown in the circumferential direction and is situated radially between the carcass reinforcement and the tread, said belt comprising a multilayer composite laminate comprising at least three superposed layers of reinforcers, said reinforcers being unidirectional within each layer and embedded in a thickness of rubber, respectively, wherein, on a tread side, a first layer of rubber comprises a first row of reinforcers, said reinforcers being first reinforcers, which are oriented at an angle a of $-5$ to $+5$ degrees with respect to the circumferential direction and made of a heat-shrinkable textile material;

wherein, in contact with the first layer of rubber and disposed beneath the first layer of rubber, a second layer of rubber comprises a second row of reinforcers, said reinforcers being second reinforcers, which are oriented at a given angle $\beta$, which is positive or negative, of between 10 and 30 degrees with respect to the circumferential direction and are metal reinforcers;

wherein, in contact with the second layer of rubber and disposed beneath the second layer of rubber, a third layer of rubber comprises a third row of reinforcers, said reinforcers being third reinforcers, which are oriented at an angle $\gamma$, the opposite of the angle $\beta$, itself being between 10 and 30 degrees with respect to the circumferential direction and are metal reinforcers;

wherein the first reinforcers made of heat-shrinkable textile material are monofilaments with a diameter $\varphi$ greater than 0.10 mm or assemblies of such monofilaments;

wherein an envelope diameter D1 of the first reinforcers is between 0.20 mm and 1.20 mm;

wherein a density $d_1$ of the first reinforcers, measured in the axial direction, is between 70 and 130 threads/dm;

wherein the second reinforcers and third reinforcers are individual steel monofilaments, which are not cabled together, with a diameter, respectively D2 and D3, of between 0.28 mm and 0.35 mm;

wherein, measured in a central part of the belt in the vulcanized state on either side of a median plane over a total axial width of 10 cm, a mean thickness $Ez_1$ of rubber separating a first reinforcer from a second reinforcer which is closest to it, measured in the radial direction, is less than or equal to 0.35 mm and a mean thickness $Ez_2$ of rubber separating a second reinforcer from a third reinforcer which is closest to it, measured in the radial direction, is between 0.15 and 0.35 mm; and wherein the following inequality is satisfied:

$$0.20 < (Ez_1 + Ez_2)/(Ez_1 + Ez_2 + D1 + D2 + D3) < 0.40.$$

2. The tire according to claim 1, wherein $Ez_2$ is between 0.25 mm and 0.35 mm.

3. The tire according to claim 1, wherein the following inequality is satisfied:

$$0.15 < Ez_1/(Ez_1 + D1 + D2) < 0.35.$$

4. The tire according to claim 1, wherein the following inequality is satisfied:

$$0.25 < Ez_2/(Ez_2 + D2 + D3) < 0.45.$$

5. The tire according to claim 1, wherein the steel is carbon steel.

6. The tire according to claim 1, wherein the heat-shrinkable textile material is a polyamide or a polyester.

7. The tire according to claim 1, wherein the first reinforcers are assemblies of 2 to 10 monofilaments.

8. The tire according to claim 7, wherein the first reinforcers are assemblies of 3 to 7 monofilaments.

9. The tire according to claim 1, wherein the diameter $\varphi$ is between 0.15 and 0.80 mm.

10. The tire according to claim 9, wherein the diameter $\varphi$ is between 0.20 and 0.60 mm.

11. The tire according to claim 1, wherein D1 is between 0.30 and 1.00 mm.

12. The tire according to claim 11, wherein D1 is between 0.40 and 0.80 mm.

13. The tire according to claim 1, wherein the density $d_1$ is between 80 and 120 threads/dm.

14. The tire according to claim 13, wherein the density $d_1$ is between 90 and 110 threads/dm.

15. The tire according to claim 1, wherein densities, $d_2$ and $d_3$, respectively, of the second and third reinforcers respectively, measured in the axial direction, is between 100 and 180 threads/dm.

16. The tire according to claim 15, wherein the densities $d_2$ and $d_3$ are each between 110 and 170 threads/dm.

17. The tire according to claim 16, wherein the densities $d_2$ and $d_3$ are each between 120 and 160 threads/dm.

18. The tire according to claim 1, wherein a thermal contraction CT of the first reinforcers made of heat-shrinkable textile material, after 2 mins at 185° C., is less than 7.5%.

19. The tire according to claim 18, wherein the CT is less than 7.0%.

20. The tire according to claim 19, wherein the CT is less than 6.0%.

21. The tire according to claim 1, wherein $Ez_1$ is between 0.10 and 0.30 mm.

22. The tire according to claim 21, wherein $Ez_1$ is between 0.15 mm and 0.30 mm.

* * * * *